United States Patent Office 3,336,396
Patented Aug. 15, 1967

3,336,396
METHOD OF MANUFACTURING 2,4,5,4'-TETRA-CHLORODIPHENYLSULFIDE
Willem Johannes Asma van Houtenlaan, Weesp, and Cornelis Johannes Schoot and Johannes Jacobus Ponjee, Emmasingel, Eindhoven, Netherlands, assignors to North American Philips Company, Inc., New York, N.Y., a corporation of Delaware
No Drawing. Filed June 8, 1965, Ser. No. 462,424
Claims priority, application Netherlands, June 18, 1964, 64—6,920
5 Claims. (Cl. 260—609)

The invention relates to a method of producing 2,4,5,-4'-tetrachlorodiphenylsulfide, a compound which is described in United States Patent 3,054,719 as a good acaricide, from 2,4,5,2',4',5' - hexachlorodiphenyldisulfide and monochlorobenzene.

A principal object of this invention is to provide a new and improved method of producing the compound 3,4,-5,4'-tetrachlorodiphenylsulfide.

This and other objects of this invention will be apparent from the description that follows:

According to the invention, the applicants have found that 2,4,5,4'-tetrachlorodiphenylsulfide can be prepared in good yield by causing 2,4,5,2',4',5'-hexachlorodiphenyldisulfide in monochlorobenzene to react with chlorine in the presence of a Friedel-Crafts catalyst.

It was surprisingly found that the rate of this reaction is so much more rapid than the chlorination of monochlorobenzene, of the disulphide and of intermediate products and the final product is so resistant against nuclear chlorination in the reaction mixture that the tetrachlorodiphenylsulfide can be obtained in a very good yield.

The reaction may be carried out by adding chlorine at −10 to +100° C. in a suspension of the hexachlorodiphenyldisulfide in monochlorobenzene in the presence of a Friedel-Crafts catalyst, for example, $AlCl_3$, $SnCl_4$, $ZnCl_2$, $FeCl_3$ or $BF_3$.

The temperature is preferably kept between 0° and 40° C. and more in particular between 25 and 30° C.

The reaction is preferably carried out with $AlCl_3$ as the catalyst. The tetrachlorodiphenylsulfide is obtained in a good yield when an equimolar quantity of catalyst calculated on the intermediately formed sulphenylchloride is used, but the same result can be obtained with smaller quantities and, in addition under such circumstances the yield of the reaction is less dependent upon the temperature. Consequently, the reaction is preferably carried out with 0.1 to 0.3 mol $AlCl_3$ per mol of disulfide.

Very good results are obtained when the reaction is carried out in a manner such that the equivalent quantity of chlorine is introduced; however, an excess for example 30% may also be used without adversely influencing the yield.

The disulfide may be reacted while suspended in monochlorobenzene but alternatively it is possible to cause it to react with chlorine while dissolved or suspended in a mixture of monochlorobenzene and a suitable solvent. Examples of solvents that may be employed are chlorinated alkanes, for example, dichloroethane and tetrachloroethane.

In order that the invention may readily be carried into effect, it will now be described in greater detail, by way of example, with reference to the following example:

Example 183.5 g. of chlorine were added to a suspension of 1 kg. of 2,4,5,2',4',5'-hexachlorodiphenyldisulfide (2.35 mol) and 62.5 g. of $AlCl_3$ (0.47 mol) in 3 litres of dry monochlorobenzene, while stirring at 35 to 40° C. within 3 hours. Then stirring was continuated at 20–25° for another 30 minutes. The reaction mixture was then poured into 1 litre of 0.5 N hydrochloric acid. After separating the liquid layers, the organic layer was once washed with ½ litre of water, after which the monochlorobenzene was removed by distillation. The melting point of the residue was 76–790 C.

The residue was poured in 4½ litre of methanol of 45–55° C. within 15 minutes. After cooling to 20 to 25° C. the precipitate was filtered off, washed with ½ litre of methanol and dried at 50–60° C. Yield 1350 g., 88%. Melting point 79–81° C.

While we have described our invention in connection with specific embodiments and applications, other modifications thereof will be readily apparent to those skilled in this art without departing from the spirit and scope of the invention as defined in the appended claims.

What we claim is:
1. A method of producing 2,4,5,4'-tetrachlorodiphenylsulfide comprising treating a mixture of 2,4,5,2',4',5'-hexachlorodiphenyl-disulfide and monochlorobenzene with chlorine in the presence of a Friedel-Crafts catalyst at a temperature between −10° C. and 100° C.
2. A method of producing 2,4,5,4'-tetrachlorodiphenylsulfide comprising treating a mixture of 2,4,5,2',4',5'-hexachlorodiphenyl-disulfide and monochlorobenzene with chlorine in the presence of aluminum chloride at a temperature between −10° C. and 100° C.
3. The method of claim 2 wherein from about 0.1 to 0.3 mol of aluminum chloride per mol of the hexachloro compound is employed.
4. The method of claim 3 wherein the treatment is carried out at a temperature between about 0° C. and 40° C.
5. The method of claim 3 wherein the treatment is carried out at a temperature between about 25° C. and 30° C.

No references cited.

CHARLES B. PARKER, *Primary Examiner.*
DELBERT R. PHILLIPS, *Assistant Examiner.*